(12) United States Patent
Wang et al.

(10) Patent No.: US 11,941,206 B2
(45) Date of Patent: Mar. 26, 2024

(54) TOUCH CONTROL COMPONENT AND TOUCH CONTROL DISPLAY DEVICE

(71) Applicant: Wuhan China Star Optoelectronics Semiconductor Display Technology Co., Ltd., Wuhan (CN)

(72) Inventors: Jieping Wang, Wuhan (CN); Jian Ye, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/284,454

(22) PCT Filed: Dec. 30, 2020

(86) PCT No.: PCT/CN2020/141437
§ 371 (c)(1),
(2) Date: Apr. 10, 2021

(87) PCT Pub. No.: WO2022/134166
PCT Pub. Date: Jun. 30, 2022

(65) Prior Publication Data
US 2023/0315231 A1 Oct. 5, 2023

(30) Foreign Application Priority Data
Dec. 25, 2020 (CN) .......................... 202011564536.8

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/0443* (2019.05);
(Continued)

(58) Field of Classification Search
CPC ........ G06F 3/04; G06F 3/0412; G06F 3/0418; G06F 3/0443; G06F 3/0446; G06F 2203/04111; G06F 2203/04112
See application file for complete search history.

(56) References Cited

U.S. PATENT DOCUMENTS

| | | |
|---|---|---|
| 2015/0220179 A1 | 8/2015 | Kimura |
| 2017/0160830 A1 | 6/2017 | Lee |
| 2019/0064960 A1* | 2/2019 | Na .......................... G06F 3/0448 |

FOREIGN PATENT DOCUMENTS

| | | |
|---|---|---|
| CN | 104615309 A | 5/2015 |
| CN | 108710447 A | 10/2018 |

OTHER PUBLICATIONS

International Search Report in International application No. PCT/CN2020/141437, dated Sep. 26, 2021.
(Continued)

*Primary Examiner* — Amy Onyekaba
*Assistant Examiner* — Cory A Almeida
(74) *Attorney, Agent, or Firm* — Nathan & Associates; Menachem Nathan

(57) ABSTRACT

A touch control component and a touch control display device are provided. The present disclosure can improve touch control sensitivity of the touch control component by at least one second branch electrode surrounding at least one first branch electrode corresponding thereto, by at least one third branch electrode adjacent to the at least one first branch electrode surrounding the at least one second branch electrode positioned between the at least one first branch electrode and the at least one third branch electrode, and by two adjacent third branch electrodes respectively positioned in two of touch control units adjacent to each other in a first direction being connected to each other on one end away from the third branch electrodes connected to a first main stem electrode.

13 Claims, 5 Drawing Sheets

(52) U.S. Cl.
CPC .. *G06F 3/0446* (2019.05); *G06F 2203/04111* (2013.01); *G06F 2203/04112* (2013.01)

(56) References Cited

OTHER PUBLICATIONS

Written Opinion of the International Search Authority in International application No. PCT/CN2020/141437, dated Sep. 26, 2021.

* cited by examiner

TOUCH CONTROL COMPONENT AND TOUCH CONTROL DISPLAY DEVICE

FIELD OF INVENTION

The present disclosure relates to the field of touch control display technologies, and more particularly, to a touch control component and a touch control display device.

BACKGROUND OF INVENTION

At present, for flexible active-matrix organic light-emitting diode (AMOLED) touch control display screens, touch control electrode patterns are usually hollowed-out metal meshes, which cause capacitance variations induced by a finger touching the flexible AMOLED touch control display screens to be smaller, and the smaller capacitance variations are not easy to be detected by touch control chips, thereby affecting touch control sensitivity. In addition, the touch control electrode patterns are manufactured on thin film encapsulation layers. However, since the thin film encapsulation layers are thin (a thickness thereof is usually 10 um), a distance between the touch control electrode patterns and a whole surface cathode of flexible AMOLED display panels is short, which causes a parasitic capacitance between the two to be large, thereby causing a great RC delay and affecting a touch report rate.

Therefore, it is necessary to provide a technical solution to improve the touch control sensitivity and the touch report rate of the flexible AMOLED touch control display screens.

Technical problem: an objective of the present disclosure is to provide a touch control component and a touch control display device having good touch control sensitivity.

SUMMARY OF INVENTION

The touch control component includes a plurality of touch control units, wherein, each of the touch control units includes a first electrode and a second electrode electrically insulated from each other.

The first electrode includes:
a first main stem electrode extending along a first direction,
at least one first branch electrode extending from an intersection of the first main stem electrode and a second main stem electrode to a direction away from the first main stem electrode and the second main stem electrode, and
at least one third branch electrode extending from the first main stem electrode to the direction away from the first main stem electrode and the second main stem electrode and disposed adjacent to at least one of the at least one first branch electrode.

The second electrode includes:
the second main stem electrode extending along a second direction, and
at least one second branch electrode extending from the intersection of the first main stem electrode and the second main stem electrode to the direction away from the first main stem electrode and the second main stem electrode.

Wherein, the at least one second branch electrode surrounds the at least one first branch electrode corresponding to the at least one second branch electrode, and the at least one third branch electrode adjacent to the at least one first branch electrode surrounds the at least one second branch electrode positioned between the at least one first branch electrode and the at least one third branch electrode; and in the first direction, two adjacent third branch electrodes respectively positioned in two of the touch control units adjacent to each other are connected to each other on one end away from the third branch electrodes connected to the first main stem electrode, and the first direction and the second direction are different.

The touch control display device includes the touch control component mentioned above and a display panel, wherein, the touch control component is disposed on a light-emitting side of the display panel.

Beneficial effect: the present disclosure provides the touch control component and the touch control display device to increase a mutual capacitance between the first electrode and the second electrode by the at least one second branch electrode surrounding the at least one first branch electrode corresponding thereto, and by the at least one third branch electrode adjacent to the at least one first branch electrode surrounding the at least one second branch electrode positioned between the at least one first branch electrode and the at least one third branch electrode, thereby being beneficial to improve touch control sensitivity of the touch control component and the touch control display device. In addition, in the first direction, the two adjacent third branch electrodes respectively positioned in the two of the touch control units adjacent to each other are connected to each other on the one end away from the third branch electrodes connected to the first main stem electrode, which increases channels of the first electrode for transmitting electrical signals and improves an impact of RC delay on electrical signal transmission, thereby being beneficial to improve a touch report rate of the touch control component and the touch control display device.

Figure 1:
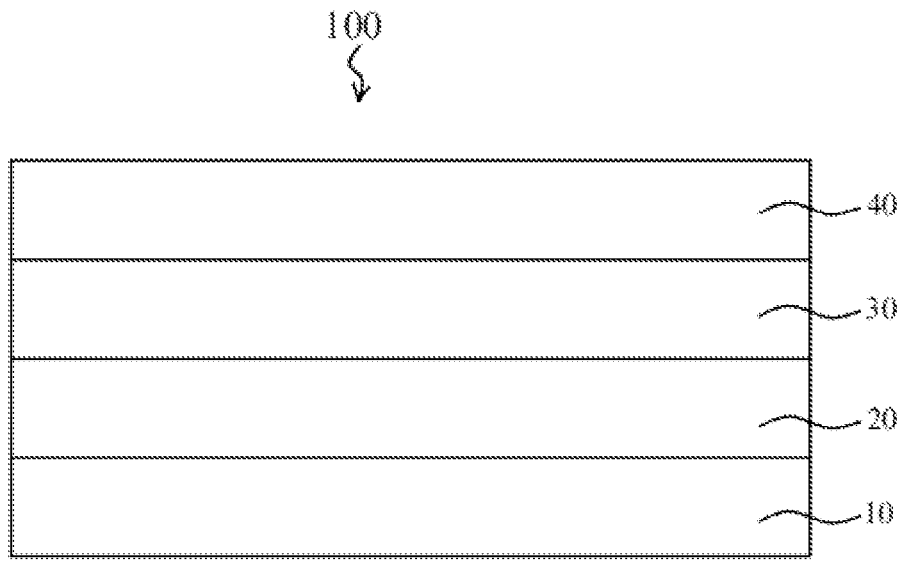
FIG. 1 is a schematic cross-sectional diagram of a touch control display device according to an embodiment of the present disclosure.

Elements in the drawings are designated by reference numerals listed below.

100. touch control display device; 10. display panel; 20. touch control component; 30. polarizer; 40. protective cover; 101. substrate; 102. thin film transistor array layer; 103. organic light-emitting diode array layer; 104. thin film encapsulation layer; 201. first electrode; 2011. first main stem electrode; 20111. first sub main stem electrode; 2011a. first main stem widening part A; 2011b. first main stem widening part B; 2012. first branch electrode; 2012a. widening part; 2012b. narrowing part; 2012c. first concave part; 2013. third branch electrode; 2013a. third convex part; 2013b. fourth convex part; 2013c. second connection part; 2014. third connection part; 2015. first electrode extending part; 2015a. first electrode extending main stem part; 2015b. first electrode extending branch part; 202. second electrode; 2021. second main stem electrode; 20211. second sub main stem electrode; 2022. bridging part; 2023. second branch electrode; 2023a. first convex part; 2023b. second convex part; 2023c. first connection part; 203. buffer layer; 204. first passivation layer; 205. second passivation layer; 20a. touch control unit; 20b. disconnected area; 206. first dummy electrode; 206a. fifth convex part; 207. second dummy electrode; 207a. sixth convex part; 208. third dummy electrode.

DETAILED DESCRIPTION OF PREFERRED EMBODIMENTS

The technical solutions in the embodiments of the present disclosure will be clearly and completely described below with reference to the drawings in the embodiments of the present disclosure. Obviously, the described embodiments are only a part of the embodiments of the present disclosure, but not all the embodiments. Based on the embodiments in the present disclosure, all other embodiments obtained by those skilled in the art without creative efforts are within the scope of the present disclosure.

Referring to FIG. 1, FIG. 1 is a schematic cross-sectional diagram of a touch control display device according to an embodiment of the present disclosure. The touch control display device 100 includes a display panel 10, a touch control component 20, a polarizer 30, and a protective cover 40. The touch control component 20 is disposed on the display panel 10 and located on a light-emitting side of the display panel 10. The polarizer 30 is attached to the touch control component 20 by a transparent adhesive layer, and the protective cover 40 is attached to the polarizer 30 by another transparent adhesive layer.

Figure 2:
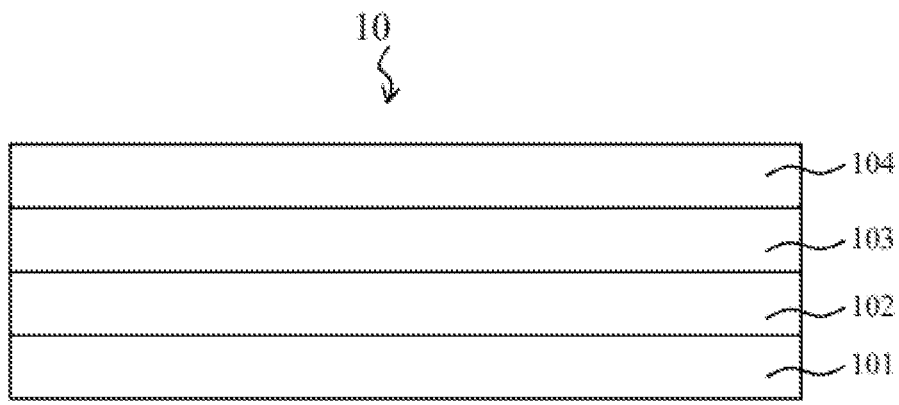
FIG. 2 is a schematic cross-sectional diagram of a display panel of the touch control display device shown in FIG. 1 according to an embodiment of the present disclosure.

The display panel 10 is configured to display pictures. The display panel 10 may be a liquid crystal display panel, an organic light-emitting diode display panel, or other display panels. Specifically, as shown in FIG. 2, FIG. 2 is a schematic cross-sectional diagram of the display panel of the touch control display device shown in FIG. 1, and the display panel 10 is a flexible organic light-emitting diode display panel. The display panel 10 includes a substrate 101, a thin film transistor array layer 102, an organic light-emitting diode array layer 103, and a thin film encapsulation layer 104. The thin film transistor array layer 102 is disposed on the substrate 101, the organic light-emitting diode array layer 103 is disposed on the thin film transistor array layer 102, and the thin film encapsulation layer 104 is disposed on the organic light-emitting diode array layer 103.

The substrate 101 is a flexible substrate, and the substrate 101 includes a polyimide layer. The substrate 101 may also be a glass substrate.

The thin film transistor array layer 102 includes a plurality of thin film transistors arranged in an array. The thin film transistors may be at least one of polysilicon transistors, metal oxide transistors, or amorphous silicon transistors. The thin film transistors may be bottom gate type thin film transistors or top gate type thin film transistors. The thin film transistor array layer 102 may also include capacitors and other devices.

The organic light-emitting diode array layer 103 includes a plurality of independent anodes, an organic light-emitting layer disposed on the anodes, and a common cathode. The common cathode is formed in a whole surface. Manufacturing materials of the anodes and the common cathode include metals or/and transparent metal oxides. Wherein, the metals include silver, copper, or other metals. The transparent metal oxides include at least one of indium tin oxide or indium zinc oxide.

The thin film encapsulation layer 104 is configured to block water vapor and oxygen from penetrating into the organic light-emitting diode array layer 103, thereby preventing the organic light-emitting layer and the common cathode from coming in contact with the water vapor and/or oxygen and shortening a service life of the display panel. A thickness of the thin film encapsulation layer 104 ranges from 8 μm to 12 μm. Specifically, the thin film encapsulation layer 104 includes a first inorganic layer, an organic layer, and a second inorganic layer. Manufacturing materials of the first inorganic layer and the second inorganic layer include at least one of silicon nitride or silicon oxide. A manufacturing material of the organic layer includes polyimide, polyacrylate, or other organic materials. The thickness of the thin film encapsulation layer 104 is usually 10 μm.

Figure 3:
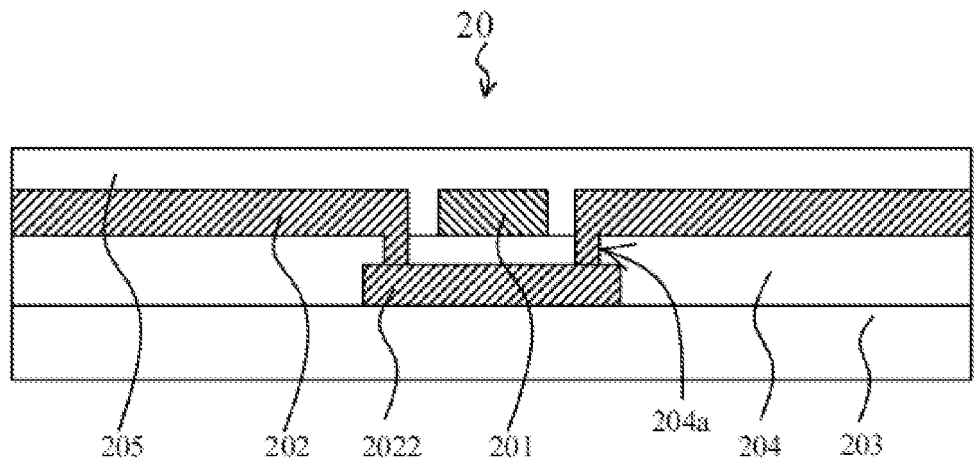
FIG. 3 is a schematic cross-sectional diagram of a touch control component of the touch control display device shown in FIG. 1 according to an embodiment of the present disclosure.

As shown in FIG. 3, FIG. 3 is a schematic cross-sectional diagram of the touch control component of the touch control display device shown in FIG. 1. The touch control component 20 includes a buffer layer 203, a plurality of first electrodes 201, a plurality of second electrodes 202, a first passivation layer 204, and a second passivation layer 205. The second electrodes 202 include bridging parts 2022, and the bridging parts 2022 are disposed on the buffer layer 203. The first passivation layer 204 covers the bridging parts 2022 and the buffer layer 203. The second electrodes 202 excluding the bridging parts 2022 are disposed on the first passivation layer 204 with the first electrodes 201. The bridging parts 2022 are connected to the second electrodes 202 located above the first passivation layer 204 by throughholes 204a in the first passivation layer 204. The second passivation layer 205 covers the first electrodes 201, the second electrodes 202 excluding the bridging parts 2022, and the first passivation layer 204. Wherein, the buffer layer 203, the first passivation layer 204, and the second passivation layer 205 are all insulating layers, which may be inorganic insulating layers or organic insulating layers. A manufacturing material of the inorganic insulating layers is at least one selected from silicon nitride or silicon oxide, and a manufacturing material of the organic insulating layers is at least one selected from polyimide or polyacrylate.

Figure 4:
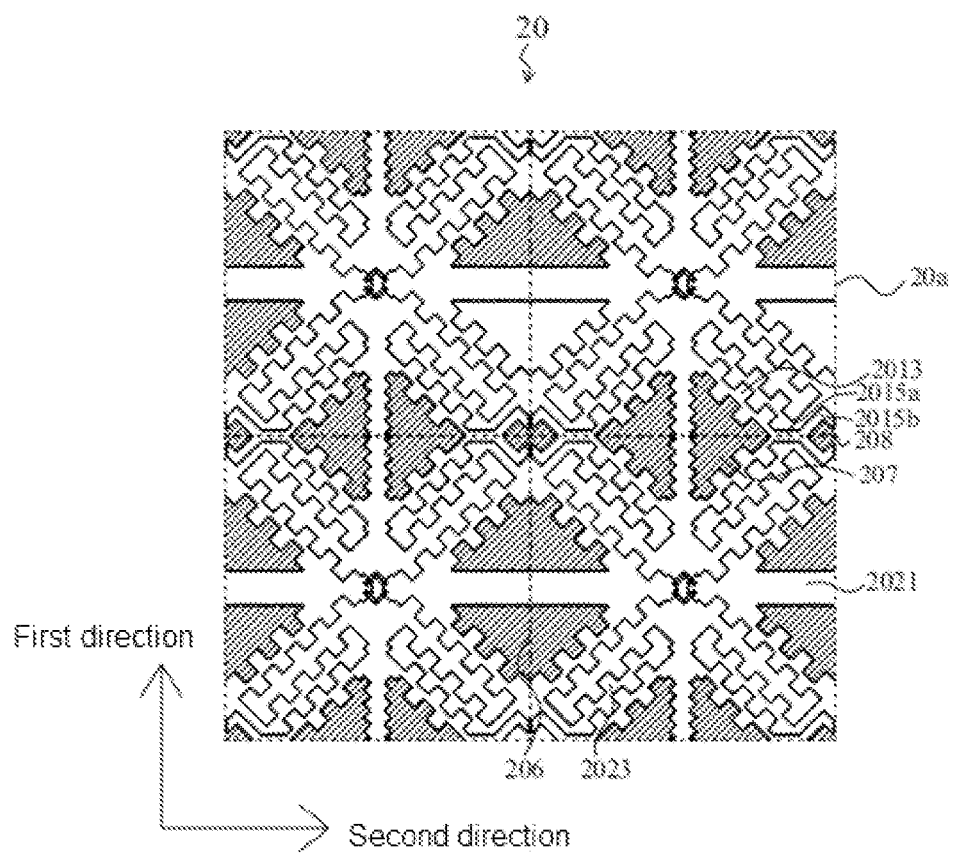
FIG. 4 is a partial schematic planar diagram of the touch control component of the touch control display device shown in FIG. 1 according to an embodiment of the present disclosure.
Figure 5:
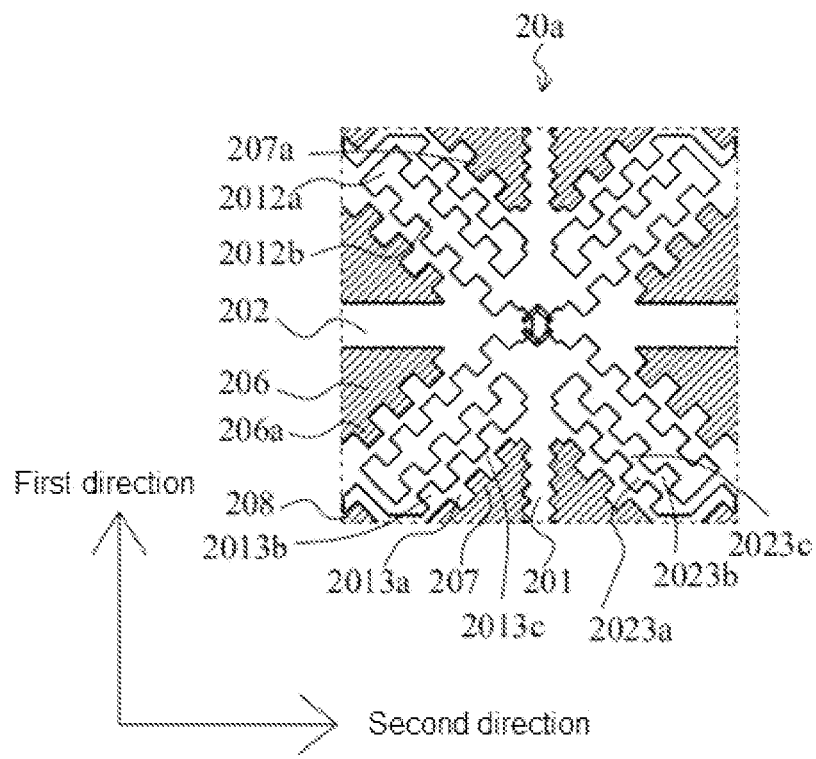
FIG. 5 is a schematic planar diagram of a touch control unit in FIG. 4 according to an embodiment of the present disclosure.
Figure 6:
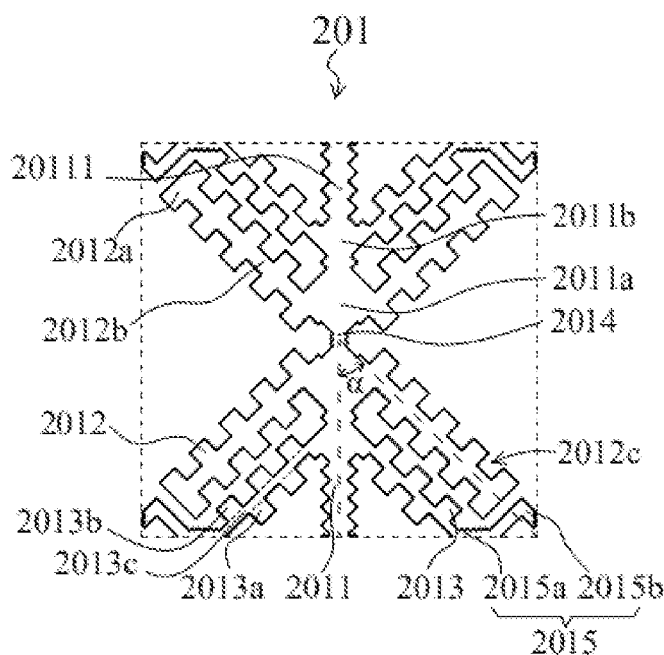
FIG. 6 is a schematic planar diagram of a first electrode of the touch control unit shown in FIG. 5 according to an embodiment of the present disclosure.
Figure 7:
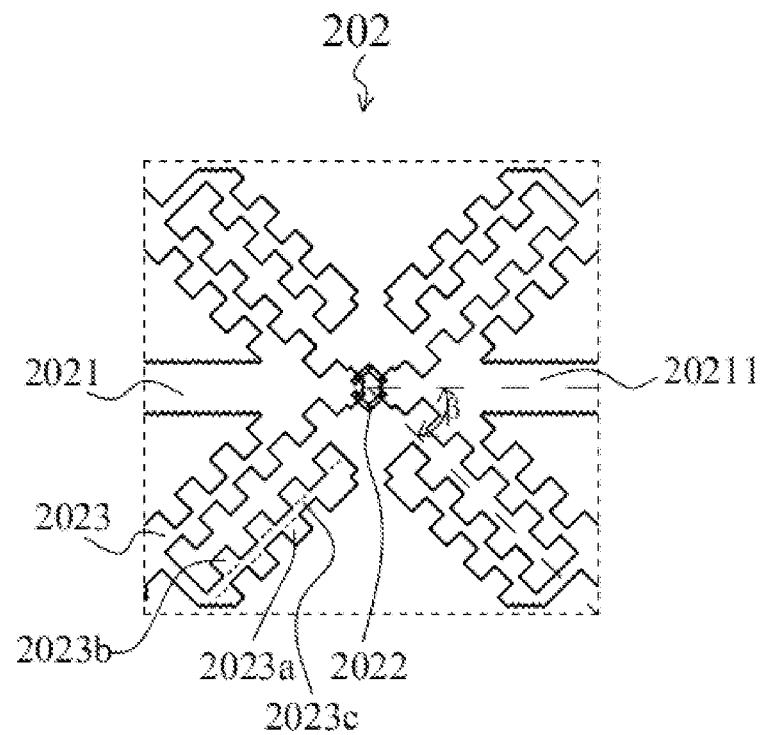
FIG. 7 is a schematic planar diagram of a second electrode of the touch control unit shown in FIG. 5 according to an embodiment of the present disclosure.

As shown in FIGS. 4 to 7, FIG. 4 is a partial schematic planar diagram of the touch control component of the touch control display device shown in FIG. 1, FIG. 5 is a schematic planar diagram of a touch control unit in FIG. 4, FIG. 6 is a schematic planar diagram of a first electrode of the touch control unit shown in FIG. 5, and FIG. 7 is a schematic planar diagram of a second electrode of the touch control unit shown in FIG. 5. The touch control component 20 includes a plurality of touch control units 20a arranged in an array. Each of the touch control units 20a acts as an independent functional unit to realize touch control function. A shape of each of the touch control units 20a is square.

Each of the touch control units 20a includes one of the first electrodes 201 and one of the second electrodes 202 which are electrically insulated from each other. The first electrode 201 and the second electrode 202 in each of the touch control units 20a constitute a mutual capacitive touch control electrode. Wherein, the first electrode 201 is a drive electrode, and the second electrode 202 is a sense electrode.

The plurality of first electrodes 201 are electrically connected to each other in a first direction and insulated from each other in a second direction, and a plurality of adjacent first electrodes 201 arranged side by side in the first direction constitute first electrode channels. The plurality of second electrodes 202 are electrically connected to each other in the second direction and insulated from each other in the first direction, and a plurality of adjacent second electrodes 202 arranged side by side in the second direction constitute second electrode channels. Wherein, the first direction and the second direction are different.

The first electrodes 201 and the second electrodes 202 may be composed of metal meshes, wherein, a manufacturing material of the metal meshes is at least one selected from molybdenum, aluminum, titanium, copper, or silver. The first electrodes 201 and the second electrodes 202 may also be composed of transparent conductive blocks, wherein, a manufacturing material of the transparent conductive blocks is at least one selected from indium tin oxide or indium zinc oxide. Specifically, the first electrodes 201 and the second electrodes 202 are composed of the metal meshes.

Figure 9:
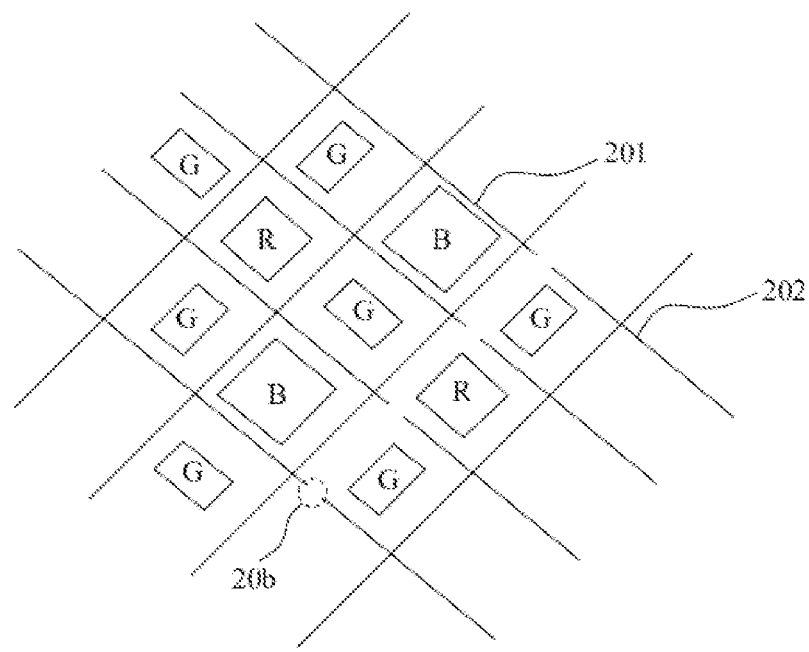
FIG. 9 is a partial schematic diagram of the touch control component corresponding to sub-pixels of the display panel when the first electrode and the second electrode are composed of metal meshes.

As shown in FIG. 9, FIG. 9 is a partial schematic diagram of the touch control component corresponding to sub-pixels of the display panel when the first electrodes and the second electrodes are composed of the metal meshes. The display panel 10 includes red sub-pixels R, green sub-pixels G, and blue sub-pixels B. The metal meshes that constitute the first electrodes 201 and the second electrodes 202 surround the red sub-pixels R, the green sub-pixels G, and the blue sub-pixels B, and one of the metal meshes surrounds one of the red sub-pixels R, the green sub-pixels G, or the blue sub-pixels B. The metal meshes are disposed surrounding the sub-pixels to prevent the metal meshes from shielding light emitted from the sub-pixels. The second electrodes 202 excluding the bridging parts 2022 are positioned in a same layer as the first electrodes 201. Electrical insulation between the first electrodes 201 and the second electrodes 202 are realized by disconnecting the metal meshes in disconnected areas 20b.

In this embodiment, as shown in FIG. 6, the first electrode 201 includes a first main stem electrode 2011, at least one first branch electrode 2012, at least one third branch electrode 2013, a third connection part 2014, and a plurality of first electrode extending parts 2015.

The first main stem electrode 2011 extends along the first direction. The first main stem electrode 2011 is a main channel for the first electrode 201 to transmit electrical signals. The first main stem electrode 2011 composed of the metal meshes has not been processed to remove part of the metal meshes, so that a resistance of the first main stem electrode 2011 is minimized, and a resistance of the first electrode 201 is smaller, thereby being beneficial to prevent delaying the electrical signals transmitted by the first electrode 201 due to large impedance and to improve a touch report rate of the touch control component.

The at least one first branch electrode 2012 extends from the first main stem electrode 2011 adjacent to an intersection of the first main stem electrode 2011 and a second main stem electrode 2021 to a direction away from the first main stem electrode 2011 and the second main stem electrode 2021. An included angle between the at least one first branch electrode 2012 and the first main stem electrode 2011 is a, and a is greater than 0 and less than 90 degrees.

The at least one third branch electrode 2013 extends from the first main stem electrode 2011 to the direction away from the first main stem electrode 2011 and the second main stem electrode 2021 and is disposed adjacent to at least one of the at least one first branch electrode 2012. The at least one third branch electrode 2013 is disposed in parallel to the at least one first branch electrode 2012 adjacent thereto, so an included angle between the at least one third branch electrode 2013 and the first main stem electrode 2011 may be equal to the included angle between the at least one first branch electrode 2012 and the first main stem electrode 2011. It can be understood that the included angle between the at least one third branch electrode 2013 and the first main stem electrode 2011 may also be not equal to the included angle between the at least one first branch electrode 2012 and the first main stem electrode 2011, and the at least one third branch electrode 2013 does not intersect the first main stem electrode 2011 adjacent thereto.

In this embodiment, the at least one first branch electrode 2012 extends from a first main stem widening part A 2011a, and the at least one third branch electrode 2013 extends from a first main stem widening part B 2011b. Resistances in the first main stem widening part A 2011a and the first main stem widening part B 2011b are smaller, thereby being beneficial to transmit the electrical signals from the first main stem electrode 2011 to the at least one first branch electrode 2012 and the at least one third branch electrode 2013, and beneficial for electrical connection between the at least one first branch electrode 2012 extending from the first main stem widening part A 2011a and the at least one third branch electrode 2013 extending from the first main stem widening part B 2011b. Wherein, an area of the first main stem widening part A 2011a is greater than an area of the first main stem widening part B 2011b.

Specifically, the first electrode 201 is disposed symmetrically about the first main stem electrode 2011 and the second main stem electrode 2021, the first main stem electrode 2011 includes two first sub main stem electrodes 20111 disposed symmetrically about the second main stem electrode 2021, and the third connection part 2014 connects the two first sub main stem electrodes 20111 of the first main stem electrode 2011. One first branch electrode 2012 and one third branch electrode 2013 extend from each side of each first sub main stem electrode 20111, and the included angle α between the first branch electrode 2012 and the first sub main stem electrodes 20111 or between the third branch electrode 2013 and the first sub main stem electrodes 20111 is 45 degrees.

As shown in FIG. 7, the second electrode 202 includes the second main stem electrode 2021, a bridging part 2022, and at least one second branch electrode 2023.

The second main stem electrode 2021 extends along the second direction. The first main stem electrode 2011 intersects the second main stem electrode 2021 at a center position of the touch control unit 20a. The second main stem electrode 2021 is a main channel for the second electrode 202 to transmit electrical signals. The second main stem electrode 2021 composed of the metal meshes has not been processed to remove part of the metal meshes, so that a resistance of the second main stem electrode 2021 is minimized, and further a resistance of the second electrode 202 is smaller, thereby being beneficial to prevent delaying the electrical signals transmitted by the second electrode 202 due to large impedance and further to improve the touch report rate of the touch control component.

The at least one second branch electrode 2023 extends from the second main stem electrode 2021 adjacent to the intersection of the first main stem electrode 2011 and the second main stem electrode 2021 to the direction away from the first main stem electrode 2011 and the second main stem electrode 2021. An included angle between the at least one second branch electrode 2023 and the second main stem electrode 2021 is β, and β is greater than 0 and less than 90 degrees.

Specifically, the second electrode 202 is disposed symmetrically about the first main stem electrode 2011 and the second main stem electrode 2021, the second main stem electrode 2021 includes two second sub main stem electrodes 20211 disposed symmetrically about the first main stem electrode 2011, and the bridging part 2022 connects the two second sub main stem electrodes 20211 of the second main stem electrode 2021. One second branch electrode 2023 extends from each side of each second sub main stem electrode 20211, and the included angle β between the second branch electrode 2023 and the second sub main stem electrodes 20211 is 45 degrees.

In this embodiment, the at least one second branch electrode 2023 surrounds the at least one first branch electrode 2012 corresponding to the at least one second branch electrode 2023, and the at least one third branch electrode 2013 adjacent to the at least one first branch electrode 2012 surrounds the at least one second branch electrode 2023 positioned between the at least one first branch electrode 2012 and the at least one third branch electrode 2013. A mutual capacitance between the first electrode 201 and the second electrode 202 can be increased by the at least one second branch electrode 2023 surrounding the at least one first branch electrode 2012 corresponding thereto with cooperation with the at least one third branch electrode 2013 surrounding the at least one second branch electrode 2023 positioned between the at least one first branch electrode 2012 and the at least one third branch electrode 2013, thereby being beneficial to increase mutual capacitance variations and further to improve touch control sensitivity.

It should be noted that the at least one first branch electrode 2012 and the at least one third branch electrode 2013 are mainly configured to generate a mutual capacitance with the at least one second branch electrode 2023, and the mutual capacitance among the at least one first branch electrode 2012, the at least one third branch electrode 2013, and the at least one second branch electrode 2023 has an impact on the mutual capacitance variations. The larger the mutual capacitance variations there are during a finger touching the touch control component 20, the higher it is in the touch control sensitivity.

In addition, when a plurality of third branch electrodes 2013 extend from each side of each first sub main stem electrode 20111, there is only one third branch electrode 2013 surrounding the second branch electrode 2023 and generating a mutual capacitance with the second branch electrode 2023, while a mutual capacitance between other third branch electrodes 2013 and the second branch electrode 2023 is small, and a parasitic capacitance between the plurality of third branch electrodes 2013 and the common cathode is larger, which will cause a parasitic capacitance between the first electrode and the common cathode to be larger. The present disclosure only has one third branch electrode 2013 extending from each side of each first sub main stem electrode 20111, thereby being beneficial to reduce the parasitic capacitance between the first electrode and the common cathode.

In this embodiment, as shown in FIG. 4, in the first direction, two adjacent third branch electrodes 2013 respectively positioned in two of the touch control units 20a adjacent to each other are connected to each other on one end away from the third branch electrodes 2013 connected to the first main stem electrode 2011. In the second direction, two adjacent second branch electrodes 2023 respectively positioned in two of the touch control units 20a adjacent to each other are connected to each other on one end away from the second branch electrodes 2023 connected to the second main stem electrode 2021.

In the first direction, a connection between the two adjacent third branch electrodes 2013 respectively positioned in the two of the touch control units 20a adjacent to each other allows the electrical signals transmitted by the first electrode 201 to be transmitted by the two connected third branch electrodes 2013 in addition to being transmitted by the first main stem electrode 2011, thereby increasing transmission channels between two first electrodes 201 in the two of the touch control units 20a adjacent to each other and improving a problem of RC delay affecting electrical transmission. In the second direction, a connection between the two adjacent second branch electrodes 2023 respectively positioned in the two of the touch control units 20a adjacent to each other allows the electrical signals transmitted by the second electrode 202 to be transmitted by the two connected second branch electrodes 2023 in addition to being transmitted by the second main stem electrode 2021, thereby increasing transmission channels between two second electrodes 202 in the two of the touch control units 20a adjacent to each other and further improving the problem of RC delay affecting the electrical transmission. In addition, an increase of electrical signal transmission channels of the first electrode 201 and an increase of electrical signal transmission channels of the second electrode 202 can prevent a reduced touch report rate caused by insufficient charging of the touch control units due to a great RC delay, thereby being beneficial to improve the touch report rate.

Compared to conventional techniques, the present disclosure can increase the mutual capacitance between the first electrode 201 and the second electrode 202 by disposing the at least one third branch electrode 2013, and the at least one third branch electrode 2013 surrounds part of the at least one second branch electrode 2023 with cooperation with the at least one second branch electrode 2023 surrounding the at least one first branch electrode 2012, thereby being beneficial to increase the mutual capacitance variations and further to improve the touch control sensitivity of the touch control component. In addition, in the first direction, the connection between the two adjacent third branch electrodes 2013 in the two of the touch control units 20a adjacent to each other can increase the electrical signal transmission channels of the first electrode 201, thereby being beneficial to improve the touch report rate of the touch control component.

In this embodiment, in the second direction, an area surrounded by the two adjacent second branch electrodes 2023 respectively positioned in the two of the touch control units 20a adjacent to each other and the second main stem electrode 2021 is provided with a first dummy electrode 206, the first dummy electrode 206 is electrically insulated from the second electrode 202, and the second branch electrodes 2023 positioned between the first dummy electrode 206 and the at least one first branch electrode 2012 mesh with the at least one first branch electrode 2012 and the first dummy electrode 206, respectively.

It should be noted that in conventional designs, when the at least one first branch electrode 2012 meshes with the at least one second branch electrode 2023, a boundary between the first dummy electrode 206 and the at least one second branch electrode 2023 is a straight boundary, that is, the first dummy electrode 206 meshing with the at least one second branch electrode 2023 in this embodiment is not exist in the conventional designs. That is, part of the first dummy electrode 206 that meshes with the at least one second branch electrode 2023 in FIG. 5 is replaced by the at least one second branch electrode 2023 in the conventional designs. However, the part of the at least one second branch electrode 2023 in the conventional designs is farther from the at least one first branch electrode 2012, so a mutual capacitance between the two is smaller, and removing the part of the at least one second branch electrode 2023 does not affect the mutual capacitance between the at least one first branch electrode 2012 and the at least one second branch electrode 2023. Therefore, under the premise that the at least one first branch electrode 2012 meshes with the at least one second branch electrode 2023, by the first dummy electrode 206 meshing with the at least one second branch electrode 2023, the present disclosure replaces the part of the at least one second branch electrode 2023 having a smaller mutual capacitance with the at least one first branch electrode 2012 in the conventional designs by the part of the first dummy electrode 206. Therefore, the mutual capacitance between the at least one first branch electrode 2012 and the at least one second branch electrode 2023 can be ensured while further reducing an area of the at least one second branch electrode 2023, thereby ensuring the touch control sensitivity while improving the touch report rate.

Compared to conventional techniques, the present disclosure removes part of the at least one second branch electrode 2023 and fills with the first dummy electrode 206, so that under the premise that the mutual capacitance among the at least one second branch electrode 2023, the at least one first branch electrode 2012, and the at least one third branch electrode 2013 is ensured, the area of the at least one second branch electrode 2023 is reduced, thereby reducing a parasitic capacitance between the at least one second branch electrode 2023 and the common cathode and preventing delaying the electrical signals transmitted by the second electrode 202. The first dummy electrode 206 ensures uniformity of light emitted from the display panel 10 and passing through the touch control component 20. In addition, by the at least one second branch electrode 2023 positioned between the first dummy electrode 206 and the at least one first branch electrode 2012 meshing with the at least one first branch electrode 2012 and the first dummy electrode 206, a meshing boundary between the at least one second branch electrode 2023 and the at least one first branch electrode 2012 is increased to increase the mutual capacitance between the at least one second branch electrode 2023 and the at least one first branch electrode 2012, while reducing the area of the at least one second branch electrode 2023, thereby reducing the parasitic capacitance between the at least one second branch electrode 2023 and the common cathode, which is beneficial to improve the touch control sensitivity and the touch report rate of the touch control component.

In the first direction, an area surrounded by the two adjacent third branch electrodes 2013 respectively positioned in the two of the touch control units 20a adjacent to each other and the first main stem electrode 2011 is provided with a second dummy electrode 207, and the second dummy electrode 207 is electrically insulated from the first electrode 201. The at least one second branch electrode 2023 positioned between the at least one first branch electrode 2012 and the at least one third branch electrode 2013 meshes with the at least one first branch electrode 2012 and the at least one third branch electrode 2013, respectively, so meshing boundaries among the at least one second branch electrode 2023 positioned between the at least one first branch electrode 2012 and the at least one third branch electrode 2013, the at least one first branch electrode 2012, and the at least one third branch electrode 2013 are increased, which further increases the mutual capacitance between the first electrode 201 and the second electrode 202, thereby being beneficial to improve the touch control sensitivity.

Further, under the premise that the at least one second branch electrode 2023 positioned between the at least one first branch electrode 2012 and the at least one third branch electrode 2013 meshes with the at least one first branch electrode 2012 and the at least one third branch electrode 2013, respectively, when a boundary between the at least one third branch electrode 2013 and the second dummy electrode 207 is a straight line, that is, a meshing part between the second dummy electrode 207 and the at least one third branch electrode 2013 in FIG. 5 is a part of the at least one third branch electrode 2013, since the part of the at least one third branch electrode 2013 is farther from the at least one second branch electrode corresponding thereto, a mutual capacitance between the two is smaller, while a mutual capacitance between the part of the at least one third branch electrode 2013 and the common cathode is larger. Therefore, by the at least one third branch electrode 2013 meshing with the second dummy electrode 207, the present disclosure replaces the part of the at least one third branch electrode 2013 having a smaller mutual capacitance with the at least one second branch electrode by the second dummy electrode 207. Therefore, the mutual capacitance between the first electrode 201 and the second electrode 202 can be ensured while minimizing an area of the at least one third branch electrode 2013, which further reduces a parasitic capacitance between the at least one third branch electrode 2013 and the common cathode, thereby being more beneficial to improve the touch report rate and the touch control sensitivity of the touch control component.

Specifically, combining with FIGS. 5 and 6, each of the at least one first branch electrode 2012 includes a plurality of widening parts 2012a and a plurality of narrowing parts 2012b, the widening parts 2012a and the narrowing parts 2012b are alternatingly connected to each other, and the narrowing parts 2012b are connected to a middle position in a width direction of the widening parts 2012a. A shape of the widening parts 2012a is rectangular, a shape of the narrowing parts 2012b is rectangular, and a width of the widening parts 2012a is greater than a width of the narrowing parts 2012b. Two adjacent widening parts 2012a and a corresponding narrowing part 2012b surrounds to form a first concave part 2012c. Each of the narrowing parts 2012b surrounds more than two sub-pixels in a width direction of the at least one first branch electrode 2012. A number of the widening parts 2012a on each of the at least one first branch electrode 2012 may be two, three, four, or more than four. Specifically, in this embodiment, the number of the widening parts 2012a on each of the at least one first branch electrode 2012 is four.

Each of the third branch electrode 2013 includes a plurality of third convex parts 2013a, a plurality of fourth convex parts 2013b, and a second connection part 2013c. The third convex parts 2013a are connected to one side of the second connection part 2013c away from the at least one first branch electrode 2012, the fourth convex parts 2013b are connected to another side of the second connection part 2013c adjacent to the at least one first branch electrode 2012, and the third convex parts 2013a and the fourth convex parts 2013b are alternatingly arranged along the second connection part 2013c. The third convex parts 2013a are disposed corresponding to the widening parts 2012a, and the fourth convex parts 2013b are disposed corresponding to the narrowing parts 2012b.

Each of the at least one second branch electrode 2023 includes a plurality of first convex parts 2023a corresponding to the widening parts 2012a, a plurality of second convex parts 2023b corresponding to the narrowing parts 2012b, and a first connection part 2023c, the first convex parts 2023a are connected to one side of the first connection part 2023c away from the at least one first branch electrode 2012, the second convex parts 2023b are connected to another side of the first connection part 2023c adjacent to the at least one first branch electrode 2012, and the first convex parts 2023a and the second convex parts 2023b are alternatingly arranged along the first connection part 2023c. The second convex parts 2023b are arranged in first concave parts 2012c, so that the second convex parts 2023b can mesh with the widening parts 2012a.

As shown in FIG. 5, the first dummy electrode 206 includes a plurality of fifth convex parts 206a, and the second dummy electrode 207 includes a plurality of sixth convex parts 207a. The sixth convex parts 207a mesh with the third convex parts 2013a of the at least one third branch electrode 2013, and the fourth convex parts 2013b mesh with the first convex parts 2023a of the at least one second branch electrode 2023. The fifth convex parts 206a mesh with the second convex parts 2023b of the at least one second branch electrode 2023. Wherein, the fifth convex parts 206a are the part where the first dummy electrode 206 replaces the part of the at least one second branch electrode 2023, and the sixth convex parts 207a are the part where the second dummy electrode 207 replaces the part of the at least one third branch electrode 2013.

In this embodiment, the first convex parts 2023a are same as the second convex parts 2023b, that is, the first convex parts 2023a and the second convex parts 2023b have a same shape and a same size. The third convex parts 2013a are same as the fourth convex parts 2013b, that is, the third convex parts 2013a and the fourth convex parts 2013b have a same shape and a same size. The first convex parts 2023a are same as the third convex parts 2013a, and a width of the second connection part 2013c is same as a width of the first connection part 2023c, so part of the at least one third branch electrode 2013 and the at least one second branch electrode 2023 between the at least one first branch electrode 2012 and the at least one third branch electrode 2013 adopts a similar design, and part of the at least one third branch electrode 2013 and the at least one second branch electrode 2023 between the at least one first branch electrode 2012 and the first dummy electrode 206 adopts a similar design.

In this embodiment, one end of each of the first electrode extending parts 2015 is connected to a junction of the two adjacent third branch electrodes 2013 in the two of the touch control units 20a adjacent to each other in the first direction, another end of each of the first electrode extending parts 2015 extends to a junction of two of the touch control units 20a adjacent to each other in the second direction and is electrically insulated from one corresponding end of an adjacent first electrode extending part 2015. The first electrode extending parts 2015 have function of electrical insulation from the second electrode 202 in the first direction and generating a mutual capacitance with the at least one second branch electrode 2023.

Specifically, as shown in FIGS. 4 and 6, each of the first electrode extending parts 2015 includes a first electrode extending main stem part 2015a and two first electrode extending branch parts 2015b extending from the first electrode extending main stem part 2015a, an area surrounded by the two first electrode extending branch parts 2015b of each of the first electrode extending parts 2015 is provided with a third dummy electrode 208, and the third dummy electrode 208 is electrically insulated from the first electrode 201. Therefore, while ensuring that the first electrode extending branch parts 2015b and the at least one second branch electrode 2023 form a larger mutual capacitance, an area of the first electrode extending parts 2015 is minimized. Wherein, the first electrode extending main stem part 2015a is parallel to the second main stem electrode 2021, and the first electrode extending branch parts 2015b are V-shaped.

Figure 8:
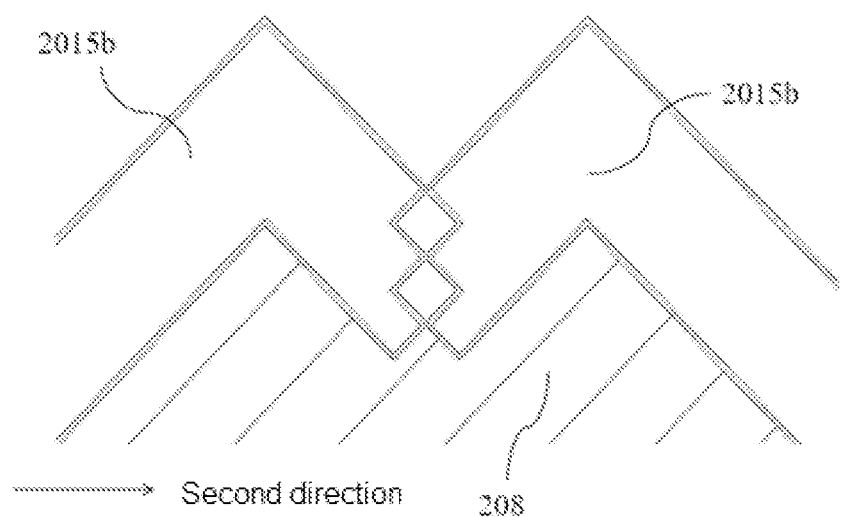
FIG. 8 is a partial schematic enlarged diagram of the touch control component shown in FIG. 4 according to an embodiment of the present disclosure.

In addition, as shown in FIG. 8, in the second direction, two adjacent first electrode extending branch parts 2015b are insulated from each other. Specifically, it is realized by cutting the metal meshes and disposing the third dummy electrode 208 in a gap between the two adjacent first electrode extending branch parts 2015b.

By the at least one second branch electrode of the second electrode surrounding the at least one first branch electrode of the first electrode, the at least one third branch electrode adjacent to the at least one first branch electrode surrounding part of the at least one second branch electrode, the at least one third branch electrode being parallel to the at least one first branch electrode, and disposing a plurality of first branch electrodes, a plurality of second branch electrodes, and a plurality of third branch electrodes symmetrical about the first main stem electrode and the second main stem electrode, the present disclosure can effectively increase the mutual capacitance between the first electrode and the second electrode while allowing mutual capacitance electrical field lines to be distributed more uniform, thereby being more beneficial to improve resolution and accuracy of detecting touch positions. In addition, the first electrodes can transmit the electrical signals between adjacent touch control units by the first main stem electrode and the at least one third branch electrode, and the second electrodes can transmit the electrical signals between adjacent touch control units by the second main stem electrode and the at least one second branch electrode, which allow contact impedance between the adjacent touch control units in the first direction and the second direction to reduce, thereby reducing impedance of the first electrode channels and the second electrode channels and being beneficial to improve the touch report rate. In addition, the first dummy electrode can effectively reduce the parasitic capacitance between the first electrode and the common cathode, and the second dummy electrode and the third dummy electrode can effectively reduce the parasitic capacitance between the second electrode and the common cathode, which can significantly improve overall RC delay between the touch control units and the common cathode, thereby being beneficial to improve the touch report rate. In addition, the first dummy electrode, the second dummy electrode, and the third dummy electrode are also configured to keep light-emitting uniformity of pixels of the display panel.

In summary, in the premise that an amount of touch control signals is increased to ensure the touch control sensitivity when a finger touches, the touch control units of the touch control component in the present disclosure can prevent a problem of a reduced touch frequency of touch screens caused by insufficient charging of the touch control units due to a great RC delay, which affects key touch performance indexes such as a report rate, thereby improving touch control performances of the touch control display device.

Figure 10:
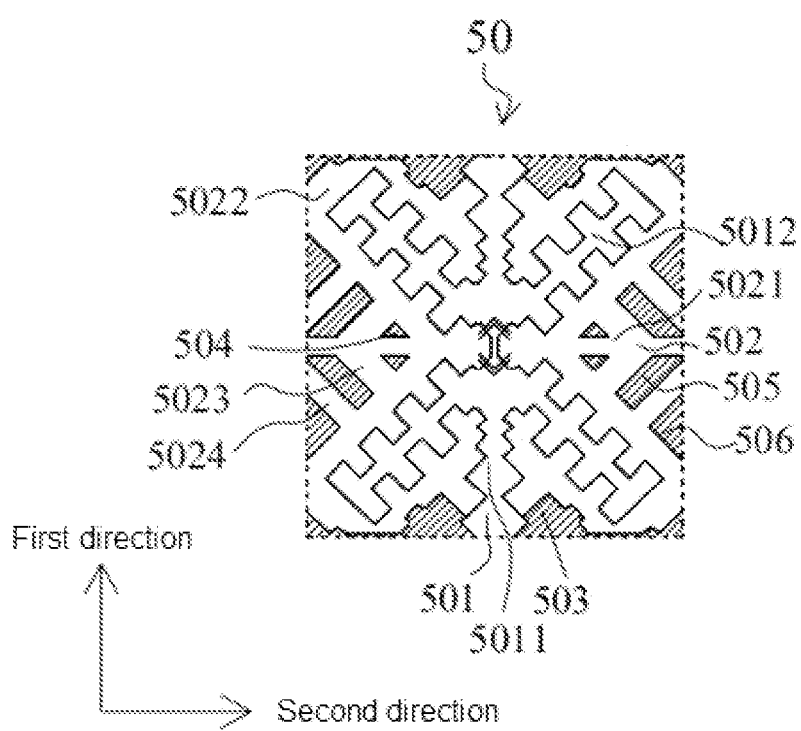
FIG. 10 is a schematic planar diagram of a touch control unit according to a comparative example of the present disclosure.

As shown in FIG. 10, FIG. 10 is a schematic planar diagram of a touch control unit according to a comparative example of the present disclosure. The touch control unit 50 shown in FIG. 10 is basically similar to the touch control unit shown in FIG. 4. A same is that the touch control unit shown in FIG. 10 includes a first electrode 501 and a second electrode 502. The first electrode 501 includes a first main stem electrode 5011 extending along the first direction and a plurality of first branch electrodes 5012. The second electrode 502 includes a second main stem electrode 5021 extending in the second direction and a plurality of second branch electrodes 5022, each of the second branch electrodes 5022 surrounds a corresponding first branch electrode 5012, and the second branch electrodes 5022 in two adjacent touch control units 50 in the second direction are connected to each other on one end away from the second branch electrodes 5022 connected to the second main stem electrode 5021. A difference is that (1) the first electrode 501 of the touch control unit 50 shown in FIG. 10 does not have the at least one third branch electrode extending out shown in FIG. 4; (2) the touch control unit 50 shown in FIG. 10 includes a plurality of fourth dummy electrodes 503, which allows the second branch electrodes 5022 in two adjacent touch control units 50 in the first direction to be electrically insulated from each other; and (3) the second electrode 502 shown in FIG. 10 also includes a plurality of first connection branch electrodes 5023 and a plurality of second connection branch electrodes 5024. One end of each of the first connection branch electrodes 5023 is connected to the second main stem electrode 5021, another end of each of the first connection branch electrodes 5023 is connected to one of the second branch electrodes 5022, and an area surrounded by one of the first connection branch electrodes 5023, the second main stem electrode 5021, and one of the second branch electrodes 5022 in each touch control unit 50 is provided with a fifth dummy electrode 504. One end of each of the second connection branch electrodes 5024 is connected to one of the second branch electrodes 5022, and another end of each of the second connection branch electrodes 5024 is connected to another second connection branch electrode 5024 positioned in an adjacent touch control unit 50 in the second direction. An area surrounded by one of the first connection branch electrodes 5023, one of the second connection branch electrodes 5024, the second main stem electrode 5021, and one of the second branch electrodes 5022 is provided with a sixth dummy electrode 505, and an area surrounded by two adjacent second branch electrodes 5022 and two adjacent second connection branch electrodes 5024 in two touch control units 50 in the second direction is provided with a seventh dummy electrode 506. Performance test results of the touch control unit shown in FIG. 4 and the touch control unit shown in FIG. 10 are as follows.

|  | touch control unit shown in FIG. 4 | touch control unit shown in FIG. 10 |
|---|---|---|
| total mutual capacitance value (pF) | 0.814 | 0.830 |
| mutual capacitance variation (pF) | 0.075 | 0.071 |
| mutual capacitance variation/ total mutual capacitance value | 0.092 | 0.086 |
| parasitic capacitance value of first electrode (pF) | 9.14 | 10.17 |
| parasitic capacitance value of second electrode (pF) | 8.46 | 17.9 |
| resistance of first electrode (ohm) | 29.3 | 37.57 |
| resistance of second electrode (ohm) | 40.8 | 30.59 |

From the above table, it can be known that a parasitic capacitance value of the first electrode shown in FIG. 4 is less than a parasitic capacitance value of the first electrode shown in FIG. 10, and a parasitic capacitance value of the second electrode shown in FIG. 4 is much less than a parasitic capacitance value of the second electrode shown in FIG. 10, which allows a parasitic capacitance between the touch control unit shown in FIG. 4 and the common cathode to be smaller, so a structural design of the touch control unit shown in FIG. 4 is more beneficial to improve the touch report rate. In addition, the parasitic capacitance value of the first electrode shown in FIG. 4 being less than the parasitic capacitance value of the first electrode shown in FIG. 10 and the parasitic capacitance value of the second electrode shown in FIG. 4 being much less than the parasitic capacitance value of the second electrode shown in FIG. 10 show that a ratio of a metal area of the first electrode shown in FIG. 4 to a metal area of the touch control unit and a ratio of a metal area of the second electrode shown in FIG. 4 to the metal area of the touch control unit are smaller. In a case that an area ratio of the first electrode and an area ratio of the second electrode in the touch control unit shown in FIG. 4 are both smaller, a mutual capacitance variation of the touch control unit shown in FIG. 4 is slightly greater than a mutual capacitance variation of the touch control unit shown in FIG. 10, and a ratio of the mutual capacitance variation of the touch control unit shown in FIG. 4 to a total mutual capacitance value is greater than the mutual capacitance variation of the touch control unit shown in FIG. 10 to the total mutual capacitance value, so the touch control sensitivity of the touch control unit shown in FIG. 4 is higher.

The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:
1. A touch control component, comprising a plurality of touch control units, wherein each of the touch control units comprises a first electrode and a second electrode electrically insulated from each other;
  the first electrode comprises:
  a first main stem electrode extending along a first direction;
  at least one first branch electrode extending from an intersection of the first main stem electrode and a second main stem electrode to a direction away from the first main stem electrode and the second main stem electrode; and
  a plurality of first electrode extending parts;

the second electrode comprises:
the second main stem electrode extending along a second direction, and
at least one second branch electrode extending from the intersection of the first main stem electrode and the second main stem electrode to the direction away from the first main stem electrode and the second main stem electrode;
wherein the first electrode further comprises at least one third branch electrode extending from the first main stem electrode to the direction away from the first main stem electrode and the second main stem electrode and disposed adjacent to at least one of the at least one first branch electrode;
wherein one end of each of the first electrode extending parts is connected to a junction of the two adjacent third branch electrodes in the two of the touch control units adjacent to each other in the first direction, another end of each of the first electrode extending parts extends to a junction of two of the touch control units adjacent to each other in the second direction, and two of the first electrode extending parts adjacent to each other are electrically insulated from each other;
wherein each of the first electrode extending parts comprises a first electrode extending main stem part and two first electrode extending branch parts extending from the first electrode extending main stem part, an area surrounded by the two first electrode extending branch parts is provided with a third dummy electrode, and the third dummy electrode is electrically insulated from the first electrode;
the at least one second branch electrode surrounds the at least one first branch electrode corresponding to the at least one second branch electrode, and the at least one third branch electrode adjacent to the at least one first branch electrode surrounds the at least one second branch electrode positioned between the at least one first branch electrode and the at least one third branch electrode; and
in the first direction, two adjacent third branch electrodes respectively positioned in two of the touch control units adjacent to each other are connected to each other on one end away from the third branch electrodes connected to the first main stem electrode, and the first direction and the second direction are different.

2. The touch control component according to claim 1, wherein in the second direction, an area surrounded by two adjacent second branch electrodes respectively positioned in two of the touch control units adjacent to each other and the second main stem electrode is provided with a first dummy electrode, and the first dummy electrode is electrically insulated from the second electrode; and
the second branch electrodes positioned between the first dummy electrode and the at least one first branch electrode mesh with the at least one first branch electrode and the first dummy electrode, respectively.

3. The touch control component according to claim 2, wherein in the first direction, an area surrounded by the two adjacent third branch electrodes respectively positioned in the two of the touch control units adjacent to each other and the first main stem electrode is provided with a second dummy electrode, the second dummy electrode is electrically insulated from the first electrode, and the third branch electrodes mesh with the second dummy electrode.

4. The touch control component according to claim 1, wherein in the second direction, two adjacent second branch electrodes respectively positioned in two of the touch control units adjacent to each other are connected to each other on one end away from the second branch electrodes connected to the second main stem electrode.

5. The touch control component according to claim 1, wherein the at least one second branch electrode positioned between the at least one first branch electrode and the at least one third branch electrode meshes with the at least one first branch electrode and the at least one third branch electrode, respectively.

6. The touch control component according to claim 5, wherein each of the at least one first branch electrode comprises a plurality of widening parts and a plurality of narrowing parts, and the widening parts and the narrowing parts are alternatingly connected to each other;
each of the at least one second branch electrode comprises a plurality of first convex parts corresponding to the widening parts, a plurality of second convex parts corresponding to the narrowing parts, and a first connection part, the first convex parts are connected to one side of the first connection part away from the at least one first branch electrode, the second convex parts are connected to another side of the first connection part adjacent to the at least one first branch electrode, and the first convex parts and the second convex parts are alternatingly arranged along the first connection part; and
each of the at least one third branch electrode comprises a plurality of third convex parts corresponding to the first convex parts, a plurality of fourth convex parts corresponding to the second convex parts, and a second connection part, the third convex parts are connected to one side of the second connection part away from the at least one first branch electrode, the fourth convex parts are connected to another side of the second connection part adjacent to the at least one first branch electrode, and the third convex parts and the fourth convex parts are alternatingly arranged along the second connection part.

7. The touch control component according to claim 6, wherein the first convex parts are same as the second convex parts, the third convex parts are same as the fourth convex parts, and the first convex parts are same as the third convex parts.

8. The touch control component according to claim 6, wherein the first electrode is set symmetrically about the first main stem electrode and the second main stem electrode, and the second electrode is set symmetrically about the first main stem electrode and the second main stem electrode;
the first main stem electrode comprises two first sub main stem electrodes set symmetrically about the second main stem electrode, and the two first sub main stem electrodes of the first main stem electrode are connected to each other by a third connection part; and
the second main stem electrode comprises two second sub main stem electrodes set symmetrically about the first main stem electrode, and the two second sub main stem electrodes of the second main stem electrode are connected to each other by a bridging part.

9. The touch control component according to claim 8, wherein one first branch electrode and one third branch electrode extend from each side of each of the first sub main stem electrodes; and
one second branch electrode extends from each side of each of the second sub main stem electrodes.

10. The touch control component according to claim 1, wherein the at least one third branch electrode is disposed parallel to the at least one first branch electrode adjacent to each other.

11. The touch control component according to claim 1, wherein an included angle between the at least one first branch electrode and the first main stem electrode is $\alpha$, and $\alpha$ is greater than 0 and less than 90 degrees; and an included angle between the at least one second branch electrode and the second main stem electrode is $\beta$, and $\beta$ is greater than 0 and less than 90 degrees.

12. The touch control component according to claim 11, wherein $\alpha$ and $\beta$ are both 45 degrees, and the first direction is perpendicular to the second direction.

13. A touch control display device, comprising the touch control component according to claim 1 and a display panel, wherein the touch control component is disposed on a light-emitting side of the display panel.

* * * * *